United States Patent [19]

Swan

[11] Patent Number: 5,058,506

[45] Date of Patent: Oct. 22, 1991

[54] BIDIRECTIONAL DRIVE AND BRAKE MECHANISM

[75] Inventor: Scott A. Swan, Friendswood, Tex.

[73] Assignee: The United States of Amaerica as represented by the Administrator, National Aeronautics and Space Administration, Washington, D.C.

[21] Appl. No.: 527,508

[22] Filed: May 23, 1990

[51] Int. Cl.$^5$ .............................................. B61D 15/08
[52] U.S. Cl. ...................................... 105/87; 105/141; 105/142; 105/124; 188/24.11
[58] Field of Search .................... 105/87, 88, 89, 95, 105/96, 98, 141, 142, 124, 86; 104/80, 81, 118; 74/142; 188/24.17, 67, 24.11; 192/5, 4 R, 6 R; 280/246, 255, 258

[56] References Cited

U.S. PATENT DOCUMENTS

| 88,366 | 3/1869 | Case . | |
|---|---|---|---|
| 167,119 | 8/1875 | Ray | 105/87 |
| 285,035 | 9/1883 | Holland . | |
| 302,090 | 7/1884 | Bernhard . | |
| 514,449 | 2/1894 | Donovan | 105/87 |
| 567,362 | 9/1896 | Small | 105/87 |
| 1,107,579 | 8/1914 | Brady | 105/87 |
| 4,758,013 | 7/1988 | Agrillo | 192/5 |
| 4,865,344 | 9/1989 | Romero et al. | 74/142 |

Primary Examiner—Robert J. Oberleitner
Assistant Examiner—Mark T. Le
Attorney, Agent, or Firm—Russell E. Schlorff; Harold W. Adams; Edward K. Fein

[57] ABSTRACT

A space transport vehicle including a body movably mounted on an elongated guide member disposed in outer space and driven therealong. A drive wheel is mounted on a drive shaft in rolling engagement with the elongated guide carrying the vehicle. A brake member on the drive shaft moves into and out of engagement with an adjacent surface of the drive wheel. An actuator on the body manually moves back and forth between spaced positions in an arc of movement. A rachet-and-pawl mechanism operates upon movements of the actuator in one direction between first and second positions for coupling the actuator to the drive wheel to incrementally rotate the wheel in one rotational direction and to operate upon movements of the actuator in the opposite direction for uncoupling the actuator from the wheel. The brake member is threadedly coupled to the drive shaft in order that the brake member will be operated only when the actuator is moved on beyond its first and second positions for shifting the brake member along the drive shaft and into frictional engagement with the adjacent surface on the drive wheel.

19 Claims, 2 Drawing Sheets

BIDIRECTIONAL DRIVE AND BRAKE MECHANISM

ORIGIN OF THE INVENTION

The invention described herein was made by an employee of the United States Government and may be manufactured and used by or for the Government of the United States without the payment of any royalties thereon or therefor.

BACKGROUND OF THE INVENTION

1. Field of the Invention

The National Aeronautics and Space Administration of the United States Government is currently developing a Space Station for launching in this present decade. This station will include various structures which are to be assembled in outer space either by human astronauts or by remotely-controlled robot devices. One of the principal structures of the Space Station is an elongated truss comprised of an assembly of tubular elements which are to be coupled to one another by a fastener system such as the system shown in U.S. Pat. No. 4,763,459. As disclosed in that patent, that particular system includes special end fittings on the truss members which are arranged to be respectively attached to so-called "node-point" fittings. These node-point fittings are hollow spherical shells with a number of spatially-disposed sockets into which the end fittings are inserted and then releasably locked. In this manner, by coupling the tubular members to selected sockets in the node-point fittings, these members can be progressively assembled as needed to construct an elongated truss of a predetermined configuration in outer space with a minimum of effort.

It will, however, be appreciated that as the truss is being progressively assembled, it will be necessary for the astronauts to travel increasingly-greater distances along the truss to transport additional truss members and other equipment to the outer end of the assembly. Moreover, once the truss has been completely assembled, the astronauts will still have to make periodic trips back and forth along the elongated truss.

Accordingly, the present invention pertains to a new and improved manually-operated transport vehicle which an astronaut can employ for traveling back and forth along an elongated truss assembly which has been positioned in outer space to transport equipment and materials between various locations along the truss assembly.

2. Background Art

Heretofore, extra-vehicular activities of astronauts in outer space have been carried out with propulsion systems of various types to move from one point to another. There has simply been no need for anything other than hand-held or back-pack propulsion devices to maneuver for short time periods and limited distances.

SUMMARY OF THE INVENTION

Accordingly, it is an object of the present invention to provide a new and improved manually-operated positioning mechanism that can be readily operated in outer space.

It is an additional object of the present invention to provide a new and improved transport vehicle which can be used in outer space for efficiently carrying personnel and equipment between spaced locations along a structure such as an elongated truss assembly to be included with the proposed NASA Space Station.

These and other objects of the present invention are attained by providing a manually-operated mechanism having a single actuating lever or handle that is adapted to be moved back and forth through a selected arc of travel. The handle is cooperatively coupled to a drive wheel by means of a gear and a pair of pawls which are arranged for one or the other to be selectively engaged with the gear for determining the direction in which the drive wheel will be rotated when the handle is being oscillated back and forth in the central portion of its selected arc of travel. In this manner, the continued movement of the actuating handle is effective for rotating the drive wheel in the rotational direction that is determined by which particular one of the two pawls was then selectively engaged with the drive gear.

The new and improved mechanism of the present invention further includes a brake mechanism cooperatively arranged to selectively supply a progressive braking action to the drive wheel in response to movements of the actuating handle into either of the terminal portions of its selected travel arc.

BRIEF DESCRIPTION OF THE DRAWINGS

The several features of the invention are set forth with particularity in the appended claims. The arrangement and practice of the invention, together with further objects and various advantages thereof, may best be understood by way of the following description of an exemplary apparatus which incorporates the principles of the invention as is illustrated in the accompanying drawings, in which:

DETAILED DESCRIPTION OF THE PREFERRED EMBODIMENT

Figure 1:
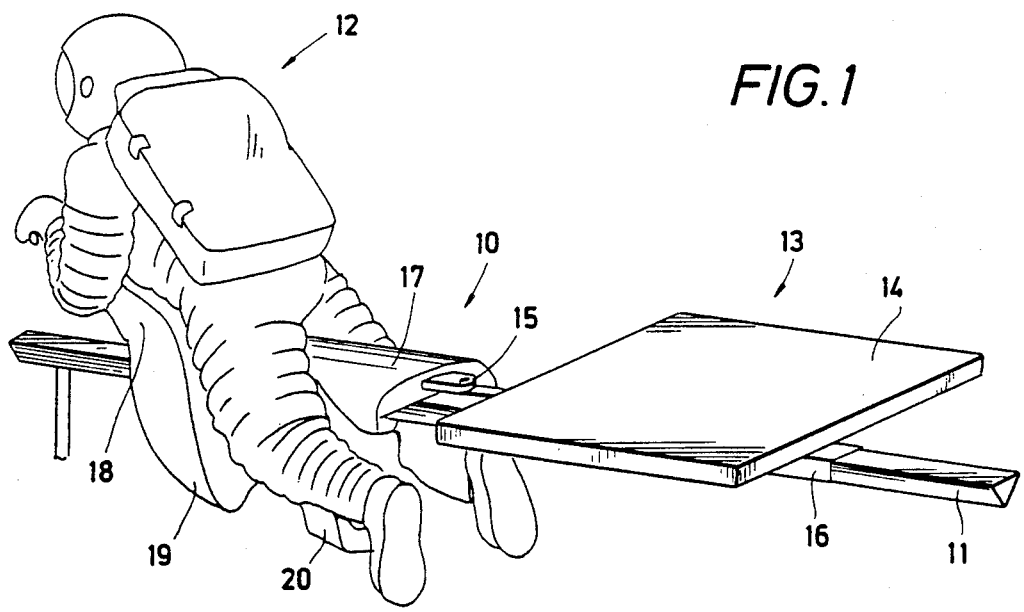
FIG. 1 is an isometric view of a preferred embodiment of a new and improved transport vehicle which is arranged in accordance with the principles of the present invention as the transport vehicle is being utilized by an astronaut to move along an elongated structural member positioned in outer space.

Turning now to FIG. 1, a preferred embodiment of the new and improved transport vehicle 10 arranged in accordance with the principles of the invention is depicted as it will appear when the vehicle is slidably mounted on an elongated track or guide, such as a monorail 11, that is secured to an elongated truss assembly forming part of a space station (not shown in the drawings) which has been positioned in outer space. As generally indicated at 12 in FIG. 1, an astronaut wearing a typical space suit is depicted using the new and improved vehicle 10 for efficiently moving along the monorail 11 to a remote location.

Although the transport vehicle 10 can, of course, be utilized solely for transporting individual astronauts along the truss assembly, the vehicle of the present invention may also be employed to tow one or more trailers, such as shown generally at 13, which are slidably mounted on the monorail 11. A suitable seat or platform 14 is operatively arranged on the trailer 13 for transporting either other astronauts or tools and equipment along the elongated truss structure supporting the monorail 11. As shown generally at 15, a trailer hitch is provided for tandemly coupling the trailer 13 to the rear end of the transport vehicle 10.

Figure 2:
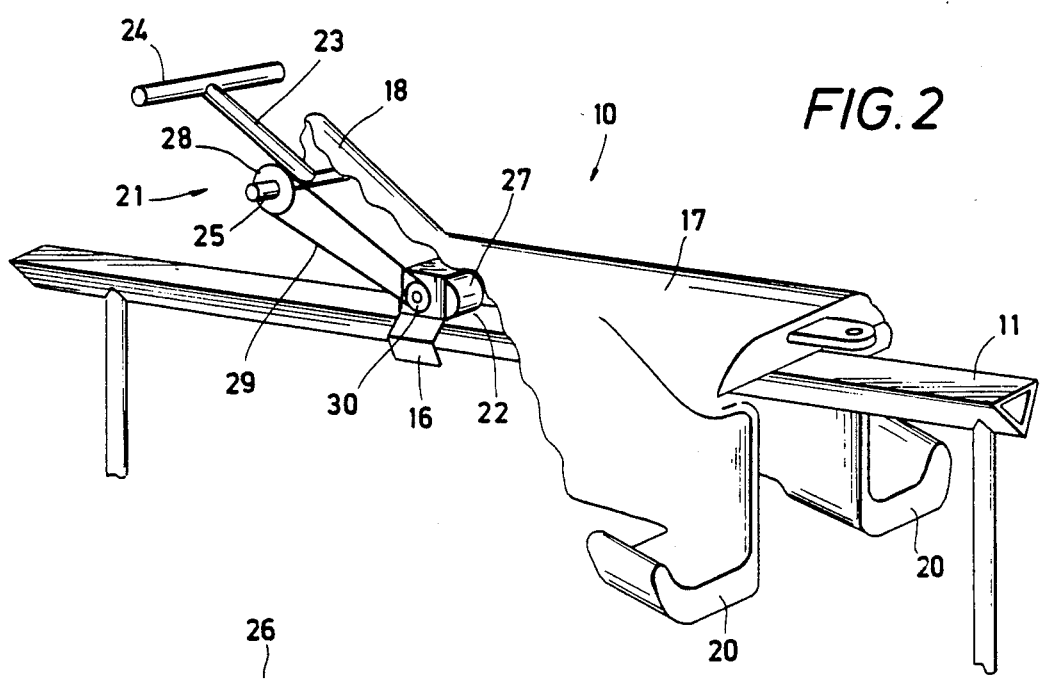
FIG. 2 is an isometric view similar to FIG. 1 but illustrates only the transport vehicle with portions thereof partially broken away to depict the bidirectional drive and brake mechanism of the present invention as it is preferably arranged on the transport vehicle.

As best illustrated in FIG. 2, the vehicle 10 is operatively retained on the monorail by a number of guide brackets, as shown generally at 16, which have depending portions straddling the opposite sides of the monorail 11. In the preferred embodiment of the transport vehicle 10 of the present invention, the central portion of the vehicle is cooperatively configured for comfortably supporting an astronaut, as at 12, in an upright or forwardly-leaning prone position. To accomplish this, the central frame of the space transport vehicle 10 is configured to provide a body support having a generally-horizontal saddle 17 appropriately shaped and sized to be comfortably straddled by an astronaut as at 12. The central body support on the space vehicle 10 is further configured for defining a forwardly-inclined upright 18 which is positioned and appropriately shaped to support the torso of the astronaut 12 without unduly restricting the upward and downward movements of the forearms of the forwardly-leaning astronaut. The body support on the vehicle 10 is also configured to provide leg supports 19 and 20 which are located on opposite sides of the saddle 17 and arranged for respectively supporting the thighs and lower legs of the astronaut 12 riding on the vehicle.

In FIG. 2, portions of the leg supports 19 and 20 have been broken away for better illustrating a preferred embodiment of bidirectional driving means 21 including a bidirectional drive-and-brake mechanism, as indicated generally at 22, and which is cooperatively arranged in accordance with the principles of the invention. The depicted preferred embodiment of the bidirectional driving means 21 further includes an upright lever or elongated actuator 23 with a transverse handle 24 on its upper end which enables the astronaut 12 to grip the opposite ends of the handle with both hands. The lower end of the actuator lever 23 is secured to the mid-point of a transverse shaft 25 that is horizontally positioned below the forward portion of the upright body support 18 and has its opposite ends journalled to the depending side walls of that body support to enable the astronaut, as at 12, to selectively rock the actuator upwardly and downwardly through a limited arc of travel (as generally indicated at 26 in FIG. 3).

In the preferred embodiment of the driving means 21 of the present invention, the drive and-brake mechanism 22 includes a cylindrical body 27 rotatably mounted on the central frame of the transport vehicle 10 and positioned just below the forward portion of the saddle 17 so that its central longitudinal axis is parallel to the central axis of the horizontal shaft 25. The body 27 is also cooperatively sized and positioned on the central frame of the vehicle 10 so that whenever the transport vehicle is in position to be moved along the monorail 11, the external peripheral surface of the cylindrical body will be frictionally engaged with the upper or adjacent surface of the monorail.

Motion-translating means are provided such as a typical chain sprocket 28 that is mounted on one end of the shaft 25 and carries a typical roller chain 29 which cooperatively couples the sprocket 28 to a second chain sprocket 30 on the outboard end of a short tubular shaft 31. As will be subsequently described in more detail by reference to FIG. 4, the short shaft 31 is coaxially arranged on an elongated shaft 32 which is extended along the longitudinal axis of the cylindrical body 27 and has its opposite ends projecting beyond each end of the body 27. To mount the cylindrical body 27 above the monorail 11, as shown in FIG. 4, the outboard ends of the elongated shaft 32 are cooperatively threaded, as at 33, to carry nuts and washers, as shown generally at 34 and 35, for rotatably supporting the cylindrical body between upright portions of the guide brackets 16 on opposite sides of the central frame of the transport vehicle 10.

Figure 3:
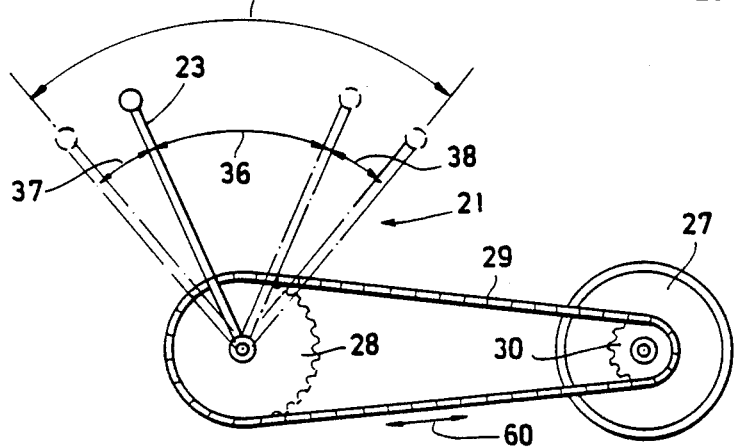
FIG. 3 is a schematic view showing the major elements of the preferred embodiment of the new and improve drive mechanism of the invention and the selected arc of travel in which the actuator for the mechanism is intended to travel.

As schematically illustrated in FIG. 3, the motion-translating means as represented by the drive chain 29 and the two sprockets 28 and 30 utilizes the predetermined movements of the actuator 23 within its overall arc of travel 26 for selectively operating the new and improved drive-and-brake mechanism 22 of the invention. As will be explained in more detail by reference to FIGS. 4 and 5, the new and improved drive-and-brake mechanism 22 of the invention includes means selectively operable for translating the transport vehicle 10 in either direction along the monorail 11 in response to the back-and-forth movements of the actuator 23 within the central or intermediate portion 36 of its overall travel arc 26. Moreover, as will be subsequently explained in more detail, the drive-and-brake mechanism 22 of the invention includes braking means selectively operable for slowing the continued advancement of the vehicle 10 along the monorail 11 by selectively moving the actuator 23 into either of the two terminal portions 37 or 38 of the overall travel arc 26 of the actuator. The braking means of the drive-and-brake mechanism 22 are further operable for bringing the transport vehicle 10 to a complete halt by simply shifting the actuator 23 toward the maximum limit of either of the two terminal portions 37 or 38 of its overall arc of travel 26. The drive-and-brake mechanism 22 is further operable to resume the advancement of the vehicle 10 by selectively returning the actuator 23 to its intermediate arc 36 and then resuming the back-and-forth oscillatory movements of the actuator within that intermediate arc of travel. As will be further explained by reference to FIG. 5, the new and improved drive-and-brake mechanism 22 is selectively operable for allowing the astronaut 12 to predetermine the direction in which the transport vehicle 10 will be advanced along the monorail 11 before the actuator 23 is moved.

Figure 4:
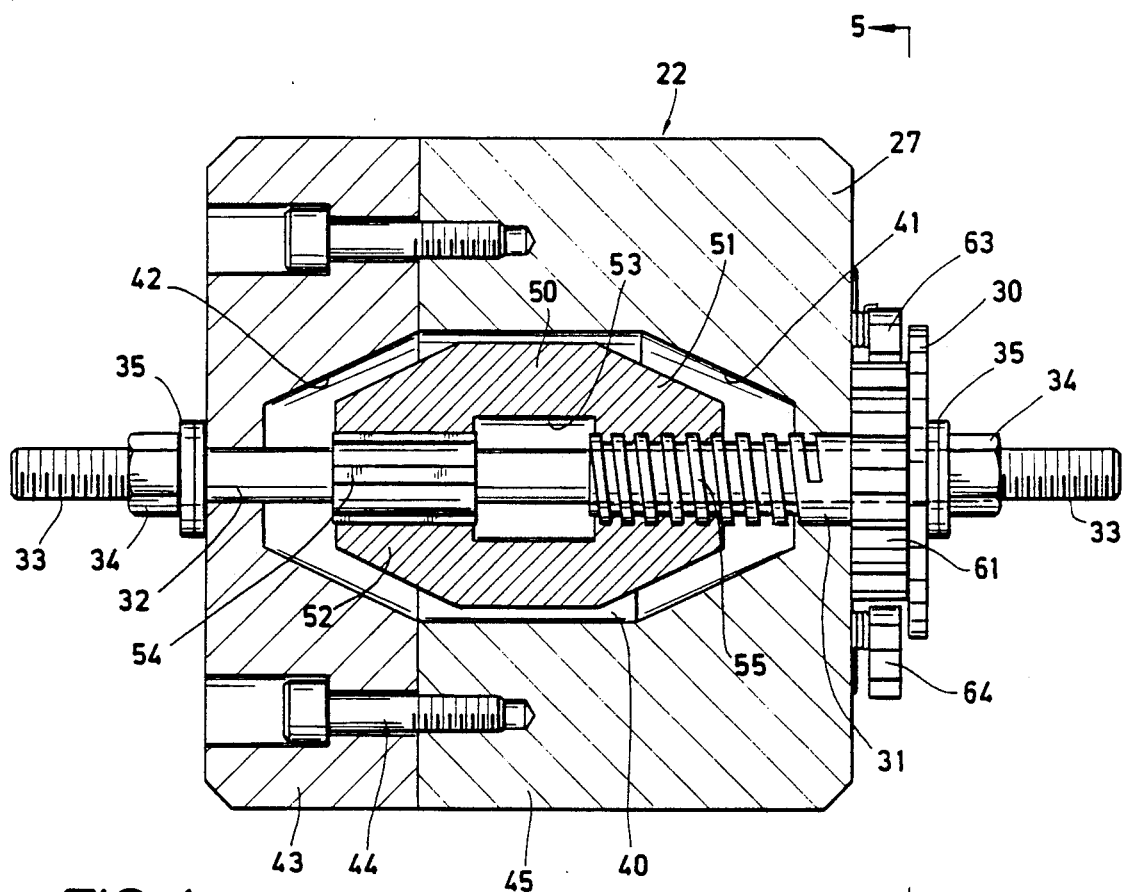
FIG. 4 is a cross-sectioned elevational view of the new and improved drive and brake mechanism employed with the transport vehicle of the present invention.

Turning now to FIG. 4 of the drawings, a cross-sectioned elevational view is shown of the preferred embodiment of the new and improved drive-and-brake mechanism 22 of the invention. As depicted there, the cylindrical body 27 is cooperatively shaped to define an internal cavity having a cylindrical mid-portion 40 and inwardly-facing frustoconical end portions 41 and 42. To simplify the fabrication and assembly of the drive-and-brake mechanism 22, the cylindrical body 27 is preferably arranged as a multi-part body which, for example, may include an end member 43 which is secured by a plurality of spatially-disposed bolts 44 to a main body member 45. In this way, the cylindrical central cavity 40 and the frustoconical end cavity 41 are arranged in the main body member 45 and the other frustoconical end cavity 42 is arranged in the separate end member 43 of the body 27.

In the preferred embodiment of the drive-and-brake mechanism 22, a double-ended brake cone 50 is arranged with oppositely-directed, frustoconical end portions 51 and 52 respectively shaped to be complementally received in the inwardly-facing frustoconical end cavities 41 and 42. As depicted in FIG. 4, the brake cone 50 includes an axial bore 53 which enables the double-ended cone to be coaxially mounted around the shafts 31 and 32 for movement within the central cavity 40 of the body 27. The elongated shaft 31 is operatively coupled to the brake cone 50 by means such as one or more complementary external and internal longitudinal splines, as generally indicated at 54, which are respectively arranged on the intermediate portion of the elongated shaft and in the internal bore 53 in the cone end portion 52 so that the double-ended cone can freely move longitudinally back and forth inside of the cavities 40-42 without rotating in relation to the cylindrical body 27.

The tubular shaft 31 and the brake cone 50 are coupled to one another by complemental multi-pitched threads 55 respectively arranged on the inward portion of the rotatable shaft 31 and the adjacent end portion 51 of the brake cone that will cause the brake cone 50 to shift longitudinally in relation to the elongated shaft 32 in response to rotation of the tubular shaft 31. It will, of course, be appreciated by those skilled in the art that by using a typical double-pitched design for the threads 55, turning the shaft 31 through even a small rotational arc will be effective to shift the brake cone 50 longitudinally through a significant travel span within the body cavities 40-42. It will also be appreciated that when the tubular shaft 31 is turned in one rotational direction, the brake cone 50 will be shifted longitudinally in one direction relative to the cylindrical body 27; and that by turning the rotatable shaft in the opposite rotational direction, the cone will be shifted in the opposite longitudinal direction. The longitudinal travel distance of the double-ended brake cone 50 will, of course, be directly proportional to the angular displacement of the rotatable shaft 31; and the direction in which the double-ended brake cone is being shifted will be determined by the rotational direction in which the tubular shaft 31 is being turned.

Referring again to FIG. 3, it will be recognized that whenever the actuator 23 is being rocked back-and-forth, the rocking movement of the actuator will be imparted to the sprocket 28 and, as indicated by the bidirectional arrow 60, this action will be effective for moving the driving chain 29 back and forth. This back-and-forth movement 60 of the driving chain 29 will, in turn, rock the sprocket 30 and the rotatable shaft 31 within a rotational arc that is dependent upon the ratio of the diameters of the sprockets 28 and 30 as well as the magnitude of the rotational arc through which the actuator 23 is being turned. As previously described, the back-and-forth rocking of the shaft 31 will cause the double-ended brake cone 50 to be shifted back and forth in a longitudinal travel span that is directly related to the magnitude of the rotational arc of the actuator 23. Thus, when the actuator 23 is being rocked back and forth in a relatively-limited arc, the double-ended brake cone 50 will be correspondingly shifted back and forth through a limited longitudinal travel span within the cylindrical body 27. On the other hand, when the actuator 23 is being moved through a much-greater travel arc, the travel span of the brake cone 50 will correspondingly increase until one or the other of its frustoconical end portions 51 and 52 is shifted into engagement with the opposing end surface of its associated body cavity 41 or 42.

Figure 5:
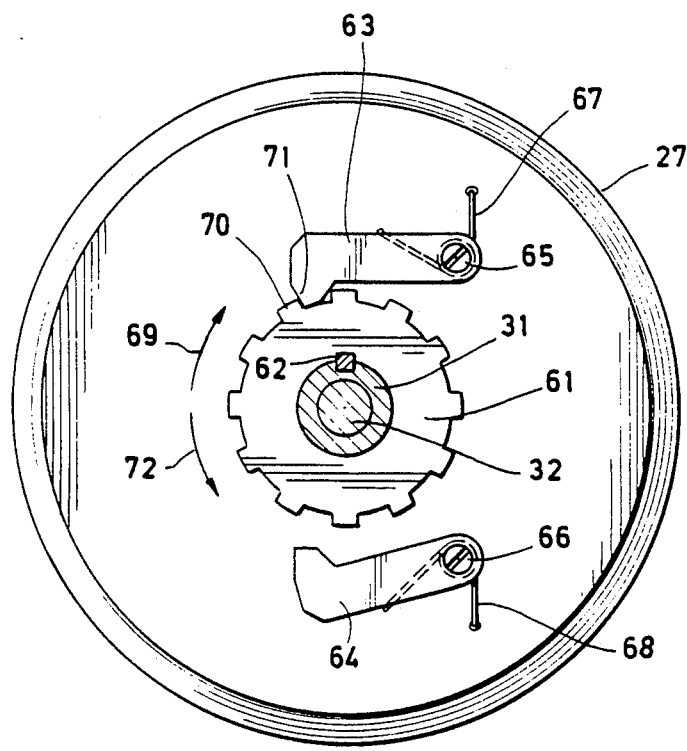
FIG. 5 is taken along the Line 5—5 in FIG. 4 to show a preferred embodiment of the pawl members of the new and improved drive mechanism of the invention.

Accordingly, in the preferred embodiment of the space transport vehicle 10, the new and improved drive-and-brake mechanism 22 is cooperatively arranged so that so long as the actuator 23 is being moved back and forth within its intermediate arc of travel 36, the double-ended brake cone 50 will be shifting freely back and forth in the body cavity 40 without ever contacting the frustoconical surfaces defined by the oppositely-directed end cavities 41 and 42. To utilize that back-and-forth movement of the actuator 23 for driving the transport vehicle 10 along the monorail 11, the drive-and-brake mechanism 22 is cooperatively arranged to utilize the rocking movement of the driven sprocket 30 for driving the cylindrical body 27 in a selected direction of rotation. Thus, as best depicted in FIG. 5, in the preferred embodiment of the drive-and-brake mechanism 22, a drive gear 61 is secured to the outward end of the rotatable shaft 31 by means such as an elongated key and groove 62. A pair of manually-operable pawls 63 and 64 are respectively pivotally mounted, as by pins 65 and 66, on the outer face of the cylindrical body 27 and each positioned so that one or the other of the pawls can be alternatively engaged with the teeth of the drive gear 61. As is typical, a pair of biasing springs 67 and 68 are cooperatively arranged on the end of the cylindrical body 27 for normally retaining one or the other of the pawls in engagement with the drive gear 61 while the other of the two pawls 63 and 64 is positioned out of engagement with the drive gear.

It will be recognized from FIG. 5 that whenever the actuator 23 is initially advanced in particular rotational direction for rotating the gear 61 in the selected direction shown by the arrow 69, when the gear 61 is initially rotated in that direction one of its teeth, as at 70, will be engaged into abutting engagement against the opposed forward surface of the nose portion 71 of the pawl 63. The continued advancement of the actuator 23 for rotating the gear 61 in this initial direction 69 will, of course, be effective for keeping that particular one of the gear teeth 70 engaged against the opposed surface of the nose 71 of the pawl 63. This continued rotational advancement of the gear 61 in this direction will thereby incrementally turn the cylindrical body 27 in the direction of the rotational arrow 69 until the actuator 23 ultimately reaches the end of that travel arc. Then, as is characteristic of any ratchet-and-pawl mechanism, when the actuator 23 is subsequently moved in the reverse or opposite rotational direction, as shown at 72 the gear 61 will also be turned in the same opposite direction. The rotation of the gear 61 in the opposite rotational direction 72 will, however, carry the gear teeth 70 into successive engagement with the inclined surface on the back side of the nose portion 71 of the pawl 63 and thereby disengage the pawl from driving engagement with the gear as the other teeth on the gear are rotated past the pawl. Then, when the actuator 23 is reversed and again moved so as to shift the gear 61 in its initial rotational direction 69 for a second time, another one of the gear teeth 70 will then move into engagement with the opposed forward surface of the nose portion 71 on the pawl 63 to again incrementally advance the cylindrical body 27 in its same initial rotational direction shown by the arrow 69. It will, of course, be recognized that since the pawl 63 will be momentarily disengaged from the gear teeth 67 each time that the actuator 23 is being returned to its starting position, the cylindrical body 27 is free to keep rotating in the initial rotational direction 69.

As a result, so long as one or the other of the two pawls, 63 or 64, is drivingly engaged with the gear 61, it will be recognized that the back-and-forth movement of the actuator 23 will be effective to incrementally rotate the cylindrical body 27 in a given direction of rotation through successive arcs of travel which are respectively proportional to the included angle of the intermediate arc of travel 36 of the actuator lever. The maximum incremental rotation of the body 27 will, of course, be achieved only when the actuator 23 is successively moved back-and-forth through the entire intermediate arc 36. In any event, since the cylindrical body 27 will remain frictionally engaged with the adjacent surface of the monorail 11, the successive incremental advancements of the cylindrical body will be effective for progressively propelling the new and improved transport vehicle 10 along the monorail. It will be further appreciated that the direction of advancement of the vehicle 10 will be selectively dependent upon which of the two pawls 63 and 64 that the astronaut 12 has previously moved into engagement with the gear 60.

In keeping with the principles of the invention, the drive-and-brake mechanism 22 is also operatively arranged so that whenever the actuator 23 is moved beyond its central or intermediate travel arc 36 into either of the two terminal portions 37 or 38 of the overall travel arc 26, the double-ended brake cone 50 will instead be longitudinally shifted a sufficient distance to bring one of its two frustoconical end portions 51 or 52 into frictional engagement with its respectively-associated complemental surface 41 or 42 in the cylindrical body 27. Thus, it will be appreciated that the astronaut 12 has the primary choice of simply swinging the actuator 23 back and forth in its intermediate travel arc 36 whenever the transport vehicle 10 is to be simply propelled along the monorail 11. Alternatively, the astronaut 12 can further choose to swing the actuator 23 out of its central travel arc 36 and into either of the two travel arcs 37 and 38 when it is desired to move the double-ended brake cone 50 into frictional engagement with one or the other of the two frustoconical end surfaces 41 or 42 of the cylindrical body 27. It will also be realized that the magnitude of this frictional engagement will be in directly relation to the extent of the longitudinal movement of the double-ended brake cone 50 relative to the cylindrical body 27 at any particular position of the actuator 23. It should be particularly recognized that since the movement of the double-ended brake cone 50 into frictional engagement with the cylindrical body 27 will be immediately sensed or felt by the astronaut 12, the astronaut will always realize when the actuator 23 has been moved beyond its intermediate arc of travel 36. The transport vehicle 10 can, of course, be reliably halted by habitually moving the actuator 23 to only one or the other of its two outer travel arcs 37 and 38 beyond the intermediate travel arc 37. Nevertheless, by arranging the two outer arcs of travel 37 and 38 at the opposite ends of the central travel arc 36, the astronaut 12 can selectively halt the vehicle 10 by simply moving the actuator 23 further in its current rotational direction.

Accordingly, it will be appreciated that the present invention has provided a new and improved space transport vehicle which is cooperatively arranged to be manually moved along a pre-positioned track or elongated guide. By arranging the new drive-and-brake mechanism 22 with a double-acting brake member, the mechanism is selectively operable for incrementally advancing the vehicle along the monorail so long as the actuator is being swung back and forth within a limited travel arc. On the other hand, the new and improved drive-and-brake mechanism is also selectively operable for slowing and halting the transport vehicle by simply moving the actuator outside of its normal limited travel arc.

While only a particular embodiment of the apparatus of the present invention has been shown and described herein, it is apparent that various changes and modifications may be made to the apparatus without departing from the broader aspects of this invention; and, therefore, the aim in the appended claims is to cover all changes and modifications which fall into the true spirit and scope of this invention.

What is claimed is:

1. A space transport vehicle comprising:
   a body arranged to be movably carried by a guide member and moved thereon along a selected travel axis;
   an actuator cooperatively mounted on said body for moving back-and-forth relative thereto in a predetermined travel span;
   a cylindrical driving member cooperatively arranged on said body for rotation about an axis of rotation transversely oriented in relation to said travel axis and positioned on said body for engaging the outer cylindrical surface of said driving member with a guide member carrying said body;
   brake means including a brake member cooperatively arranged on said driving member for moving into and out of engagement with at least one surface of said driving member;
   motion-translating means on said body cooperatively coupling said actuator to said driving member and said brake member and operable upon back-and-forth movement of said actuator within a first portion of its said travel span for rotatably driving said driving member and operable upon movement of said actuator to a second portion of its said travel span for selectively moving said brake member into engagement with said one surface of said driving member;
   means coupling said actuator to said body for pivotal movement relative thereto between spaced positions in said first portion of its said travel span as well as for pivotal movement to at least a second portion of its said travel span; and
   wherein said second portion of said travel span is located adjacent to one end of said first portion thereof; and said travel span further includes a third portion located at the opposite end of said first portion of said travel span so that said brake member can be selectively engaged with said drive member by moving said actuator beyond either end of said first portion of said travel span.

2. The space transport vehicle of claim 1 including means cooperatively arranged for supporting an astronaut in a position for manually moving said actuator back and forth within its said travel span.

3. The space transport vehicle of claim 1 including means cooperatively arranged for supporting at least one object to be transported along said selected travel axis.

4. The space transport vehicle of claim 1 including first means cooperatively arranged for carrying an astronaut in a position for manually moving said actuator back and forth within its said travel span; and second means cooperatively arranged for carrying at least one object to be transported along said selected travel axis.

5. The space transport vehicle of claim 4 wherein said first means include a seat on said body for supporting an astronaut thereon and said second means include a platform cooperatively coupled to said body to the rear of said seat.

6. The space transport vehicle of claim 4 wherein said first means include a seat on said body for supporting an astronaut in a forwardly-inclined position thereon and at least one leg-support member on each side of said body; and said second means include a platform releasably and tandemly coupled behind said body for being towed along said selected travel axis.

7. The space transport vehicle of claim 1 wherein said motion-translating means include a first sprocket coupled to said actuator and movable back and forth in response to its pivotal movements within its said travel span, a second sprocket coaxially disposed around said axis of rotation of said driving member and rotatably coupled thereto, a drive chain intercoupling said first and second sprockets, and ratchet-and-pawl means arranged between said second sprocket and said driving member and selectively operable in response to said back-and-forth movements of said actuator within said first portion of its said travel span for translating those movements into successive incremental rotational movements of said driving member in one rotational direction for progressively driving said body in one longitudinal direction along a guide member carrying said body.

8. The space transport vehicle of claim 7 wherein said ratchet-and-pawl means are also selectively operable in response to said back-and-forth movements of said actuator within said first portion of its said travel span for translating those movements into successive incremental rotatational movements of said driving member in the opposite rotational direction for alternatively moving said body in the opposite longitudinal direction along a guide member carrying said body.

9. A space transport vehicle comprising: a body arranged to be movably mounted on an elongated guide member and propelled therealong in a selected travel axis; actuating means on said body including an actuator arranged for movement back and forth in a predetermined range of travel; driving means including a drive shaft arranged on said body for rotation about an axis transversely oriented in relation to said travel axis, and a drive wheel mounted on said drive shaft and arranged to be positioned in rolling engagement with an elongated guide member carrying said body; means operable in response to back-and-forth movements of said actuator in said travel range including a ratchet-and-pawl mechanism operable upon movements of said actuator in one direction for coupling said actuator to said drive shaft to incrementally rotate said drive wheel in one rotational direction and operable upon movements of said actuator in the opposite direction for uncoupling said actuator from said drive shaft; and braking means including a brake member arranged on said drive shaft for longitudinal movement therealong, and means threadedly coupling said brake member to said drive shaft and operable upon movements of said actuator outside of a selected portion of said travel range for rotating said drive shaft to engage said brake member with said drive wheel and operable upon movements of said actuator within said selected portion of said travel range for rotating said drive shaft to disengage said brake member from said drive wheel.

10. The space transport vehicle of claim 9 wherein said brake member is moved into frictional engagement with said drive wheel upon movements of said actuator in said one direction beyond said selected portion of said travel range.

11. The space transport vehicle of claim 9 wherein said brake member is moved into frictional engagement with said drive wheel upon movements of said actuator in said opposite direction beyond said selected portion of said travel range.

12. The space transport vehicle of claim 9 wherein said brake member is moved into frictional engagement with said drive wheel upon movements of said actuator in either of said directions beyond said selected portion of said travel range.

13. The space transport vehicle of claim 9 wherein said brake member is coaxially mounted on said drive shaft and operatively arranged within said drive wheel and between longitudinally-spaced opposed surfaces thereon so that said brake member will be longitudinally advanced in a first direction along said drive shaft to frictionally engage one end of said brake member with one of said opposed surfaces on said drive wheel upon movements of said actuator in said one direction beyond said selected portion of said travel range and said brake member will be longitudinally advanced in a second direction along said drive shaft to frictionally engage the other end of said brake member with another opposed surface of said drive wheel upon movements of said actuator in said opposite direction beyond said selected portion of said travel range.

14. The space transport vehicle of claim 9 wherein said actuating means include means pivotally coupling said actuator on said body for movement in said travel range, a first sprocket coupled to said actuator and movable back and forth in response to its pivotal movements within its said travel range, a second sprocket coaxially disposed around said drive shaft, and a drive chain intercoupling said first and second sprockets.

15. The space transport vehicle of claim 14 wherein said ratchet-and-pawl mechanism is arranged between said second sprocket and said drive wheel and includes first and second pawls which are arranged to be alternatively moved into operating positions, said first pawl being selectively operable by said back-and-forth movements of said actuator within said selected portion of said travel range for translating those movements into successive incremental rotatational movements of said drive wheel in said one rotational direction for driving said body in one selected longitudinal direction along a guide member carrying said body, said second pawl being selectively operable by said back-and-forth movements of said actuator within said selected portion of said travel range for translating those movements into successive incremental rotatational movements of said drive wheel in the opposite rotational direction for driving said body in the opposite longitudinal direction along a guide member carrying said body.

16. The space transport vehicle of claim 15 wherein said brake member is moved into frictional engagement with said drive wheel upon movements of said actuator in said one direction beyond said selected portion of said travel range.

17. The space transport vehicle of claim 15 wherein said brake member is moved into frictional engagement with said drive wheel upon movements of said actuator in said opposite direction beyond said selected portion of said travel range.

18. The space transport vehicle of claim 15 wherein said brake member is moved into frictional engagement with said drive wheel upon movements of said actuator in either of said directions beyond said selected portion of said travel range.

19. The space transport vehicle of claim 15 wherein said brake member is coaxially mounted on said drive shaft and operatively arranged within said drive wheel and between longitudinally-spaced opposed surfaces thereon so that said brake member will be longitudinally advanced in a first direction along said drive shaft to frictionally engage one end of said brake member with one of said opposed surfaces on said drive wheel upon movements of said actuator in said one direction beyond said selected portion of said travel range and said brake member will be longitudinally advanced in a second direction along said drive shaft to frictionally engage the other end of said brake member with another opposed surface of said drive wheel upon movements of said actuator in said opposite direction beyond said selected portion of said travel range.

* * * * *